United States Patent [19]

Gluntz

[11] Patent Number: 5,063,020
[45] Date of Patent: Nov. 5, 1991

[54] STEAM-WATER SEPARATING CONSTRUCTION FOR BOILING WATER NUCLEAR REACTORS

[75] Inventor: Douglas M. Gluntz, San Jose, Calif.

[73] Assignee: General Electric Company, San Jose, Calif.

[21] Appl. No.: 529,795

[22] Filed: May 29, 1990

[51] Int. Cl.⁵ .............................................. G21C 15/16
[52] U.S. Cl. .................................... 376/371; 376/352; 376/370; 376/373
[58] Field of Search ............... 376/352, 360, 370, 371, 376/373, 379, 282, 378; 122/491

[56] References Cited

U.S. PATENT DOCUMENTS

| 1,708,654 | 4/1929 | Andrews | 122/491 |
| 1,730,133 | 10/1929 | Gibson | 122/491 |
| 3,057,333 | 10/1962 | Kuhner | 122/491 |
| 3,924,575 | 12/1975 | Zipay | 122/491 |
| 4,812,286 | 4/1989 | Gluntz | 376/282 |
| 4,912,733 | 3/1990 | Gluntz | 376/371 |

Primary Examiner—Brooks H. Hunt
Assistant Examiner—Frederick H. Voss
Attorney, Agent, or Firm—R. R. Schroeder

[57] ABSTRACT

A boiling water nuclear fission reactor is disclosed with a unique steam-water separating system. The steam-water separation means comprises an assemblage of open troughs positioned above the fuel core which reduces the amount of steam recycled through the coolant circuit.

10 Claims, 2 Drawing Sheets

STEAM-WATER SEPARATING CONSTRUCTION FOR BOILING WATER NUCLEAR REACTORS

FIELD OF THE INVENTION

This invention relates to water cooled nuclear fission reactors of the so-called boiling water type. Boiling water nuclear reactors comprise a steam generating plant wherein reactor water coolant is circulated through a core of heat producing fissionable nuclear fuel to transfer thermal energy from the fuel to the coolant, thereby generating a two-phase steam-water mixture at the core. The steam-water mixture flowing out from the fuel core is separated into its respective phase whereupon the steam is piped from the reactor for use in steam driven turbines and other equipment, and the liquid water is recirculated back through the fuel core along with make up feedwater.

BACKGROUND OF THE INVENTION

In typical boiling water reactors used for power generating operations, reactor coolant is circulated endlessly cycling through a flow path comprised of a core entrance plenum located below the heat producing fuel core, up through the fuel core itself, on through an upper plenum region located above the core and which serves to collect all the coolant passing through fuel assemblies comprising the core, then on upward through an area for separation of steam from liquid water overhead of the core upper plenum, and finally around back downward outside the core, along a region termed the downcomer annulus, to return to the core lower plenum. If the reactor is designed as a natural circulation type boiling water reactor, this final flow path outside the core is directed and uninterrupted. A cylindrical member enshrouding the core and extending some distance both above and below the elevations containing the fuel core is positioned between upwardly flowing coolant passing through the reactor core, and downwardly flowing coolant recycling back to the core lower plenum. If the reactor type is a forced circulation reactor, some form of pumping mechanism is positioned outboard of the core shroud member along this portion of the flow path to amplify the pressure head otherwise present in the core lower plenum region.

The water coolant in such boiling water reactors during their power generating operation exists, at the core entrance, in the form of a subcooled liquid. This subcooled liquid has been produced by mixing, early along the downcomer annulus flow path, two streams: a feedwater steam that has large temperature subcooling relative to reactor operating pressure conditions, and a saturated liquid stream which has been derived by the partitioning of two-phase steam-water mixture produced downstream from the exit from the core. The feedwater stream has a mass flow rate that is controlled to match the reactor steam output mass flow rate, so that the coolant inventory and water level within the reactor remain nominally constant. The aforementioned partitioned saturated liquid stream typically has a mass flow rate many times the mass flow rate of the feedwater stream, so that the temperature of the mixed stream arriving in the core lower plenum lies closer to the coolant saturated conditions than to the feedwater entrance conditions.

As the reactor coolant passes through the core, heat is transferred from the fuel assemblies to the coolant. The water coolant emerges from the heat producing fuel core as a two-phase mixture of steam vapor and liquid water, the proportions of which vary depending on such factors as the power output from the fuel, the amount of subcooling present in the feedwater, the total hydrodynamic flow resistance presented by the fuel core design and structure and its wetted surface, and the amount of orificing representing restrictions to flow immediately prior to the entrance of the coolant into the individual core fuel assemblies.

Conventional fuel assemblies of boiling water reactors are composed of a multiplicity of fuel units, such as rods, grouped together in bundles, with each bundle surrounded by an open ended channel for flow lengthwise therethrough of coolant water. These channeled bundles of fuel units are spaced apart from each other to provide intermediate spaces for insertion of control blades. Thus, there are ample areas for coolant water bypass flow beyond close proximity to the heat producing fuel units within a bundle.

Bypass flow coolant water passes through the fuel core without closely encountering the high energy emanating from the fuel and enters the core upper plenum consisting substantially of saturated liquid with perhaps a small amount of steam. This bypass effluent joins the two-phase steam-water mixtures exiting from individual fuel assemblies comprising the core. These two effluents rapidly mix together within the core upper plenum losing identity from their origin, with the result of a combined overall steam-water mixture containing significant proportions of water.

The circulating coolant emerging upward from the fuel core surrounded by the core shroud as a two-phase mixture of vaporized steam and liquid water varies in proportions which are dependent upon several factors, including power output of the fuel, the amount of subcooling present in the coolant passing up into the fuel core, the total hydrodynamic flow resistance presented by the fuel geometry and wetted surfaces, and the amount of orificing representing restrictions to fluid flow just prior to the coolant's entry into the fuel core assembly.

The two-phase mixture comprising vaporized steam bubbles entrained within liquid water coolant produced within the heat generating fuel core, upon reaching the upper region of the above core plenum adjacent the shroud top, goes through a buoyancy-driven classification of the steam vapor and liquid water into separate components. Steam, being the lighter component and present in the form of gas bubbles entrained within a continuous saturate liquid water medium, is carried by buoyancy forces to the mixture free-surface. The steam bubbles emerge, or break out from the free-surface while the liquid water, being the heavier component of the mixture, remains in place except for a short steam layer containing dense moisture produced immediately above the free-surface by the breaking out action of the steam bubbles.

The thus classified water remaining within the mixture is continuously displaced by the circulating coolant comprising a steam-water mixture emerging from the fuel core and flowing up within the shroud, whereupon the liquid coolant water becomes diverted to a lateral outward direction of flow over the top rim or edge of the core shroud. As this deflected water travels outward and over the top rim of the core shroud, steam bubbles floating upward towards the mixture free-surface of the circulating coolant are swept along by the laterally moving liquid water coolant. The rising steam bubbles in the peripheral region of the shroud are more susceptible to being enveloped and carried along by the lateral flow. Moreover, since gaseous steam bubbles typically comprise about 80 percent of the volume of the upward flow within the upper plenum area from the fuel core, the quantity of diverted steam can be significant. Also, the lateral flow velocity of the liquid coolant component increases with the distance extending outward from the center of the core shroud. Thus, the highest lateral velocities developed by the liquid coolant occur at the periphery of the shroud.

Established potential flow theory holds that at progressively closer vertical positions from the mixture free-surface straight downward to the top rim of the shroud, water lateral flow velocities will be highest close by the shroud upper rim and the water velocities will diminish at successively higher elevations along this same diameter. Under these conditions the now fast-moving lateral flowing water component collides with the steam-water mixture rising upwardly through the shroud, whereby some steam bubbles of the mixture are swept laterally outward over the top rim of the shroud and carried along with the circulating coolant flow downward into the downcomer annulus flow path external to the core shroud.

Steam carried over into the downcomer annulus with the circulating coolant rapidly becomes condensed when combined with the incoming makeup coolant feedwater. Since steam has a very high thermal energy per unit mass, even a small amount of steam carryover such as, for example, only 1.7 percent by weight steam carryover experienced by the Dodewaard natural circulation reactor, substantially reduces the effective cooling of the total combined circulating coolant. When this "steam heated" coolant enters into the fuel core, its inadvertently added thermal energy results in reduced cooling effectiveness whereby boiling with the production of vaporized steam bubbles begins closer to the inflow of the coolant into the fuel core, namely at a lower location of the fuel core with an upward circulating coolant.

This steam carryover heating of the coolant entering the fuel core causes several troublesome conditions in the reactor performance. For example, as the occurrence of voids increases within the fuel core due to premature boiling and formation of steam bubbles, higher irreversible pressure drops occur within the core. This in turn impedes the recirculation flow. Also, coolant higher void content produces greater negative reactivity due to reduced neutron moderation whereby control rods must be further withdrawn from the fuel core which diminishes the length of fuel burnups for a given core initial enrichment, among other adverse effects.

SUMMARY OF THE INVENTION

This invention comprises an improved system for separating steam vapor from circulating liquid water coolant in boiling water nuclear fission reactor plants. The invention includes a novel arrangement for moderating the flow velocity of the circulating coolant comprising a mixture of bubbles of steam vapor and liquid water emerging from the heat generating fuel core and surrounding shroud with surface area expanding means.

OBJECTS OF THE INVENTION

It is a primary object of this invention to provide improved steam-water separating means for boiling water nuclear fission reactors.

It is a further object of this invention to provide an improved boiling water nuclear fission reactor having a steam-water separating system which enhances the operation and efficiency of the nuclear reactor performance.

It is a still further object of this invention to provide a boiling water nuclear fission reactor having a unique steam-water separating system that reduces the amount of steam entrained in and carried with the circulating liquid coolant through a cycle including passing through the fuel core.

It is also an object of this invention to provide a steam-water separating means for a boiling water nuclear fission reactor that enhances control of the temperature of recycling coolant water.

DETAILED DESCRIPTION OF THE INVENTION

This invention consists of a unique measure for enhancing the separation of steam vapor from liquid water coolant in the operation of a boiling water nuclear fission reactor plant which contributes to the overall effectiveness and efficiency of the reactor operating performance.

Figure 1:
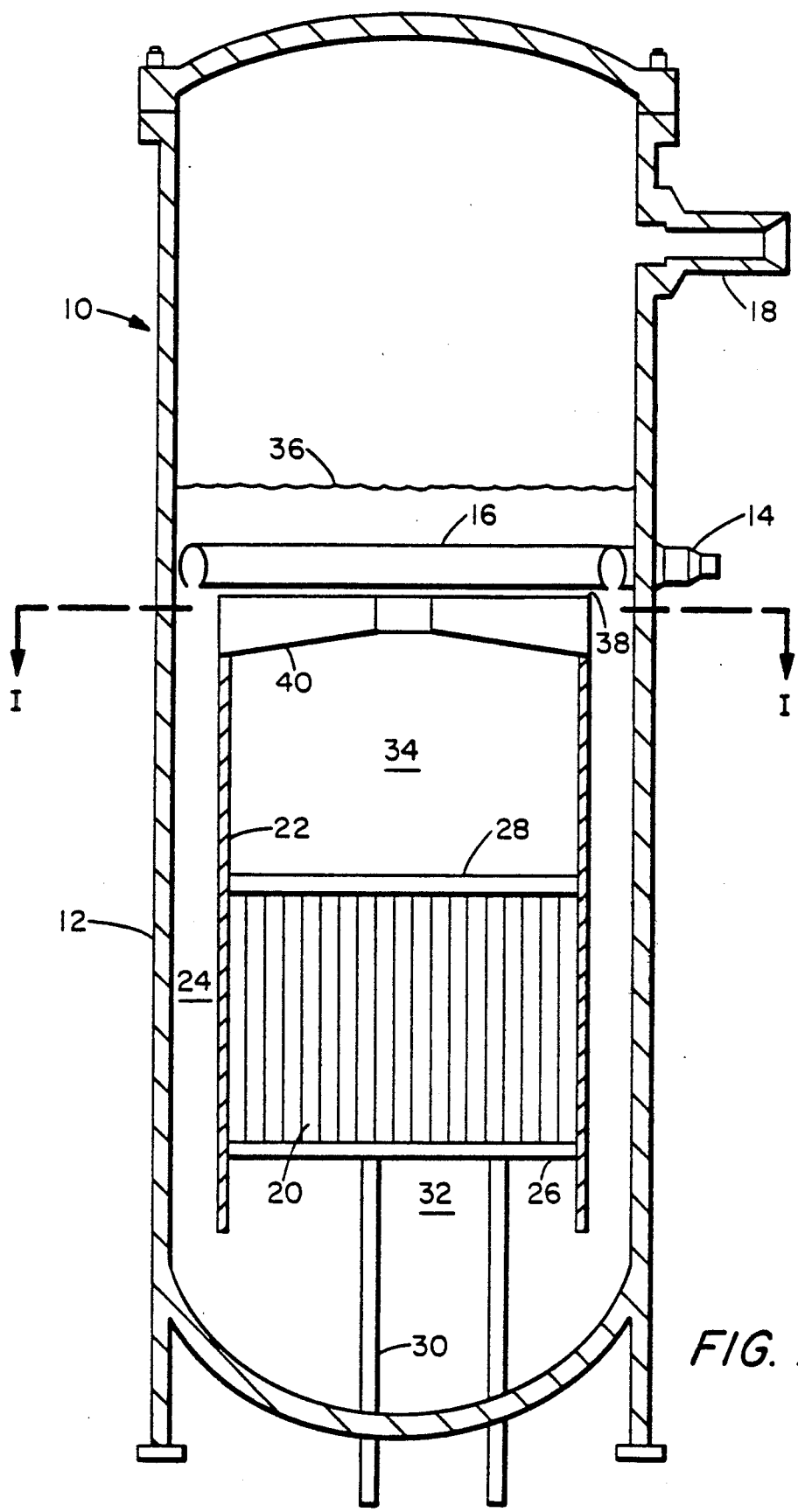
FIG. 1 comprises a vertical sectional view of a boiling water nuclear fission reactor with part in elevation.

Referring to the drawings, in particular FIG. 1, a boiling water nuclear fission reactor plant 10 includes a reactor pressure vessel 12 having a feedwater inlet 14 for the introduction into the pressure vessel 12 of a makeup portion of the reactor recirculating coolant water through an annular distribution 16. A steam outlet 18 is provided in an upper area of the pressure vessel 12 for the discharge therefrom of produced steam to be used in appropriate work such as turbine generation of electrical power.

A core of heat producing fissionable fuel 20 is located within the pressure vessel 12, generally intermediate its length and surrounded by an open ended, cylindrical shroud 22. Fuel core shroud 22, which extends substantially above and below the fuel core 20 is spaced inward from the wall of the pressure vessel 12 to provide an annular coolant water flow path 24 intermediate the wall of the pressure vessel 12 and the shroud 22 surrounding the fuel core 20.

The fuel core 20 is supported on an underlying core support plate 26 and the upper portion of the spaced apart fuel units of the core 20 are held in position with top spacing grid plate 28. Control rods 30, which regulate the rate of the nuclear fission reaction of the fuel in the core 20, move upward into the arrayed fuel units or bundles of the core 20, and back downward out from the core as needed to manipulate the fission produced neutron flux.

Beneath the fuel core 20 and its support plate 26, and encircled within core shroud 22, is a lower fuel core plenum area 32 providing an entry channel for circulating coolant flowing upward through the fuel core 20 to remove heat and produce steam therefrom. Superimposed above the fuel core 20 and top spacing grid plate 28, and encircled within core shroud 22, is an upper fuel core plenum area 34 providing an exit channel for circulating coolant flowing upward and out from the fuel core 20 where it has been heated to constitute a mixture of steam vapor bubbles dispersed through liquid water.

In operation, the coolant circuit for the nuclear reactor plant 10 comprises continuously circulating makeup feedwater from inlet 14, dispersed around vessel 12 through annular distributer 16, combined with recycling coolant which has passed through the fuel core 20. The coolant circuit flow courses downward through the annular coolant flow path 24 between the wall of the pressure vessel 12 and fuel core shroud 22. At the lower terminus of core shroud 22, adjacent the lower end of the pressure vessel 12, the coolant flow circuit reverses its downward direction passing around the lower end of shroud 22, entering the lower core plenum area 32 and continuing upward within the shroud 22 passing through the heat producing fuel core 20. On emerging from the fuel core 20, the coolant which has been heated to constitute a two-phase mixture of steam vapor bubbles dispersed in liquid, in proportions depending upon several factors, flows upward through the upper core plenum area 34. In the region adjacent to the top rim of the shroud 22, the upward flowing mixture of steam and water undergoes a buoyancy-driven separation of the steam vapor from the liquid water, with the steam ascending on upward and emerging out through the fluctuating vapor-liquid interface 36 above the top rim of the fuel core shroud 22. The ascending steam free from the liquid coolant continues upward through driers (not shown) and exits from the pressure vessel 12 through steam outlet 18. Simultaneously, the liquid coolant takes a lateral flow-direction upon exiting from the top of the core shroud 22, passing horizontally radially outward over the top rim 38 of the shroud 22 and reversing direction by returning to the annular coolant flow path 24, then coursing downward combined with added makeup coolant from the feedwater inlet 14 via the annular distribution 16 to repeat the continuous recirculation cycle.

However, as noted hereinbefore, upon the flow course turning outward and passing over the top rim of the shroud, the high velocity of the liquid coolant tends to sweep a portion of the steam bubbles from this upward buoyancy rising course and carry them along in the liquid stream back into the coolant circuit.

In accordance with this invention, an arrangement of open-top troughs 40 are proved bridging across the upper open end of the core shroud 22 to reduce the velocity of the circulating coolant flowing over the top of the rim 38 of the shroud 22 on reversing its direction of flow from upward through shroud 22 to coursing downward about the annular fuel path 24 outside the shroud upon repeating the coolant cycle. This reduced velocity of the circulating coolant flowing generally horizontally and radially outward from the shroud and over its circumferential rim 38 significantly reduces the amount of vaporized steam bubbles, which are buoyancy ascending upward through the coolant within the shroud 22, that is otherwise swept along with the coolant.

Figure 2:
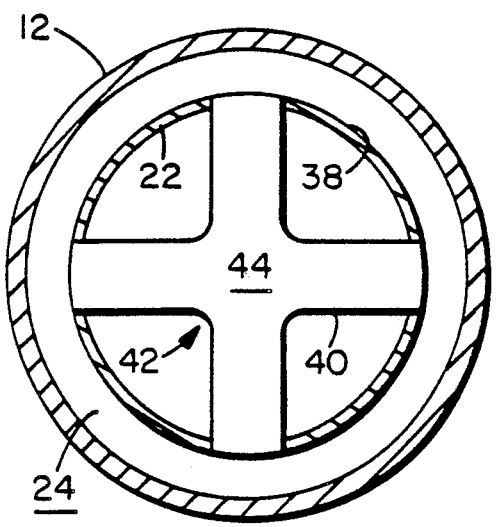
FIG. 2 is a transverse cross-sectional view taken along lines I—I of the illustration of FIG. 1.
Figure 4:
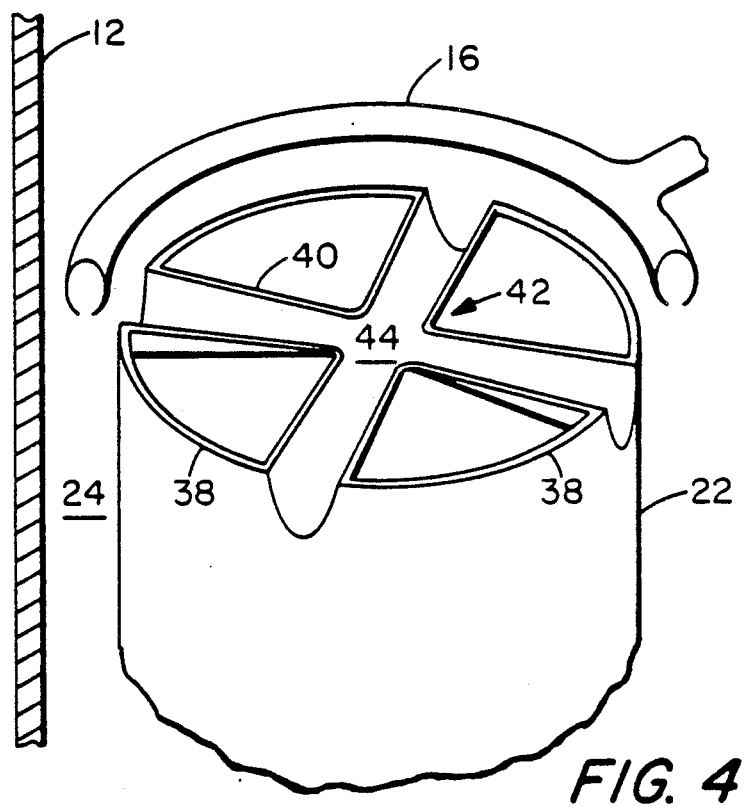

The trough arrangement 40 of this invention comprises an open top, three sided or U-shaped trough configuration which extends transversely across the upper end of the core shroud 22, as shown in FIGS. 1 and 4, at approximately the level of the upper rim 38 of the shroud. The upper edges of the trough(s) 40 should be about on the same plane as the upper rim 38 of the shroud 22, and as shown in FIG. 2, the open ends of the trough(s) 40 pass through the upper edge portion of the shroud 22, or extend to cut-outs in the upper edge portion whereby any fluid contents of the trough 40 can flow therefrom at a level beneath the top rim 38 of the shroud 22 out into the annular flow path 24. Specifically, a portion of the upper edge of the shroud 22 corresponding to the transverse profile of the trough 40 is removed to enable the outermost end of each trough to adjoin or pass through the upper edge portion of the shroud so as to provide for uninhibited flow outward through the open end of the trough into the annular coolant flow path 24.

Figure 3:
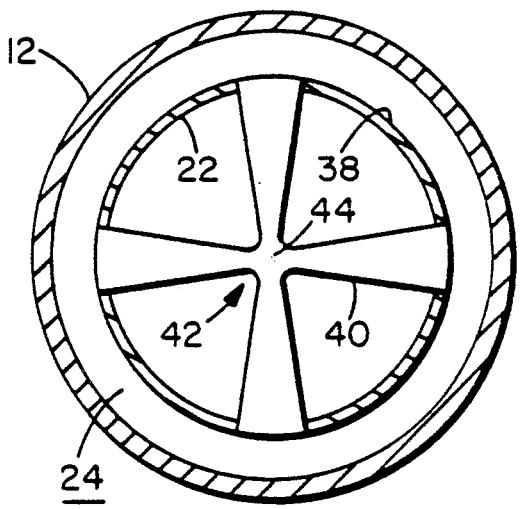
FIG. 3 is another transverse cross-sectional view taken along line I—I of the illustration of FIG. 1 illustrating a different embodiment; and, FIG. 4 is a perspective view of a portion of the nuclear fission reactor of FIG. 1, showing the improvement of this invention.

In a preferred embodiment of this invention the trough 40, as shown in FIGS. 2, 3 and 4, comprise an assemblage 42 bridging across the upper open end of the cylindrical core shroud 22 and having a multiplicity of centrally intersecting troughs joined at a common center 44 with each trough 40 generally horizontally projecting radially outward from a common center 44. Typically the assemblage 42 comprises three, four or five, or more troughs 40 radiating horizontally outward spoke-like, from the common center 44 to the upper edge of shroud 22.

Preferably each radiating trough 40 slopes slightly downwards as it radiates outward from the common center 44 to facilitate fluid flow therefrom out into the annular coolant flow path 24. It is also preferred that the radiating troughs 40 are of greater depth than width. Additionally it is desirable that the troughs 40 increase in volume as they extend outward from the common center 44. This can be effected by providing each trough 40 with an outward flair or progressive expansion of depth and/or width, such as shown in FIG. 3.

The troughs 40 provide a protected runoff channel extending laterally outward for the liquid coolant component of the two-phase steam vapor-liquid water mixture flowing upward from the fuel core and undergoing separation due to the buoyancy of the steam vapor phase. The collective action of the troughs 40 in receiving and conducting a substantial portion of the liquid coolant outward into the annular coolant flow path 24 significantly reduces the volume and velocity of the liquid coolant spilling over the perimeter rim of the shroud 22. This reduced velocity of the liquid coolant spill over lowers the amount of steam vapor bubbles of the mixture swept along with the liquid phase thereby facilitating the buoyancy separation of the steam.

The resultant enhancement in steam-water separation provided by this invention reduces the steam carryover and circulation with the recycling coolant whereby the temperature of the coolant passing through the heat producing fuel core has been inadvertently increased above that desired and of optimum conditions for most effective reactor performance.

What is claimed is:

1. A boiling water nuclear fission reactor having an improved steam-water separator system, consisting essentially of the combination of a reactor pressure vessel having an inlet for supplying coolant feedwater and an outlet for steam discharge and containing a core of fissionable fuel for producing heat to generate steam, said fuel core being mounted within the reactor pressure vessel and surrounded by an open ended cylindrical shroud which is spaced inward away from the pressure vessel to provide an annular flow path between the pressure vessel and he shroud surrounding the fuel core whereby supplied coolant feedwater together with recirculating liquid coolant feedwater together with recirculating liquid coolant can flow downward around the exterior of the shroud surrounding the fuel core and then around back upward through the shroud and fuel core for the transfer of thermal energy for the fuel core and generation of steam from liquid coolant and thereby producing a mixture of liquid water and steam vapor, a core upper plenum area superimposed above the fuel core and surrounded by an upper portion of the open ended cylindrical core shroud, and a steam-water separator adjoining and transferring the upper open end of the cylindrical core shroud comprising at least one three sided open top through briding horizontally across the upper open end of the cylindrical core shroud and extending outward through the uppermost edge portion of the open ended shroud whereby any fluid contents of a trough can flow outward there from at a level beneath the uppermost open edge of the core shroud into the annular flow path between the pressure vessel and the core shroud.

2. The boiling water nuclear fission reactor of claim 1, wherein the upper edges of the open top horizontal trough is approximately level with the upper open end of the cylindrical core shroud 3. The boiling water nuclear fission reactor of claim 1, wherein the steam-water separator comprises a multiplicity of open top troughs bridging horizontally a ross the upper open end of the cylindrical core shroud.

4. A boiling water nuclear fission reactor pressure vessel having an inlet for supplying coolant feedwater and an outlet for steam discharge and containing a core of fissionable fuel for producing heat to generate steam, said fuel core being mounted within the reactor pressure vessel and surrounded by an open ended cylindrical shroud which is paced inward away from the pressure vessel to provide an annular flow path between the pressure vessel and the shroud surrounding the fuel core whereby supplied coolant feedwater together with recirculating liquid coolant can flow downward around the exterior of the shroud surrounding the fuel core and then around back upward through the shroud and fuel core for the transfer of thermal energy from the fuel core and generation of steam from liquid coolant and thereby producing a mixture of liquid water and steam vapor, a core upper plenum area superimposed above the fuel core and surrounded by an upper portion of the cylindrical core shroud, and a steam-water separator adjoining the upper end of the cylindrical core shroud comprising at least one open top trough bridging across the upper open end of the cylindrical core shroud and extending thought eh upper most edge portion of the shroud whereby any fluid contents of a trough can flow outward there from at a level beneath the uppermost edge of the core shroud into the annular flow path between the pressure vessel and the core shroud, said trough being of greater depth than width.

5. A boiling water nuclear fission reactor having an improved steam-water separating system, consisting essentially of the combination of a reactor pressure vessel having an inlet for supplying coolant feedwater and an outlet for steam discharge and containing a core of fissionable fuel for producing heat to generate steam, said fuel core being mounted within the reactor pressure vessel and surrounded by an open ended cylindrical shroud which is spaced inward away from the pressure vessel to provide an annular flow path between the pressure vessel and the shroud surrounding the fuel core whereby supplied coolant feedwater together with recirculating liquid coolant can flow downward around the exterior of the shroud surrounding the fuel core and then around back upward through the shroud and fuel core for the transfer of thermal energy from the core and generation of steam from liquid coolant and thereby producing a two-phase mixture of liquid water and steam vapor, a core upper plenum area superimposed above the fuel core and surrounded by an upper portion of the open ended cylindrical core shroud, and a steam-water separator adjoining and transferring the upper open trough assemblage bridging horizontally across the upper open end of the cylindrical core shroud and having a multiplicity of centrally intersecting troughs joined a ta common center with each trough generally horizontally projecting radially outward from the common center and extending outward through the uppermost open edge portion o the shroud whereby any fluid contents of the troughs can flow outward therefrom at a level beneath the uppermost open edge of the core shroud into the annular flow path between the pressure vessel and core shroud.

6. The boiling water nuclear fission reactor of claim 5, wherein the open top troughs bridging horizontally across the upper open end of the cylindrical core shroud slope outwardly downwards from the center of the core shroud.

7. The boiling water nuclear fission reactor of claim 5, wherein the upper edges of the open top horizontal troughs are approximately level with the upper open end of the cylindrical core shroud.

8. A boiling water nuclear fission reactor pressure vessel having an inlet for supplying coolant feedwater and an outlet for seam discharge and containing a core of fissionable fuel for producing heat to generate steam, said fuel core being mounted within the reactor pressure vessel and surrounded by an open ended cylindrical shroud which is paced inward away from the pressure vessel to provide an annular flow path between the pressure vessel and the shroud surrounding the fuel core whereby supplied coolant feedwater together with recirculating liquid coolant can flow downward around the exterior of the shroud surrounding the fuel core and then around back upward through the shroud and fuel core for the transfer of thermal energy from the fuel core and generation of steam from liquid coolant and thereby producing a two-phase mixture of liquid water and steam vapor, a core upper plenum area superimposed above the fuel core and surrounded by an upper portion of the cylindrical core shroud, and a steam-water separator adjoining the upper end of the cylindrical core shroud comprising a trough assemblage bridging across the upper open end of the cylindrical core shroud and having a multiplicity of centrally intersecting troughs joined at a common center with each trough generally horizontally projecting radially outward from the common center and extending through the uppermost edge portion of the shroud whereby any fluid contents of the troughs can flow outward therefrom at a level beneath the uppermost edge of the core shroud into the annular flow path between the pressure vessel and core shroud, said troughs being of greater depth than width.

9. The boiling water nuclear fission reactor of claim 5, wherein the horizontal troughs increase in volume as they extend outward from the center of the core shroud to the upper open edge of the cylindrical shroud.

10. A boiling water nuclear fission reactor having an improved steam-water separator system, comprising the combination of a reactor pressure vessel having an inlet for supplying coolant feedwater and an outlet for steam discharge and containing a core of fissionable fuel for producing heat to generate steam, said fuel core being mounted within the reactor pressure vessel and surrounded by an open ended cylindrical shroud which is spaced inward away from the pressure vessel to provide an annular flow path between the pressure vessel and the shroud surrounding the fuel core whereby supplied coolant feedwater together with recirculating liquid coolant can flow downward around the exterior of the shroud surrounding the fuel core and then around back upward through the shroud and fuel core for transfer of the thermal energy from the fuel core and generation of steam from liquid coolant and thereby producing a two-phase mixture of liquid water and steam vapor, a core upper plenum area superimposed above the fuel core and surrounded by an upper portion of the cylindrical core shroud, and a steam-water separator adjoining the upper end of the cylindrical core shroud comprising a trough assemblage bridging across the upper open end of the cylindrical core shroud and having a multiplicity of centrally intersecting troughs joined at a common center with each trough generally horizontally projecting radially outward from a common center and extending through the uppermost edge portion of the core shroud whereby any fluid contents of the troughs can flow outward therefrom at a level beneath the uppermost edge of the core shroud into the annular flow path between the pressure vessel and core shroud, said troughs being of greater depth than width with their upper edges approximately level with the upper open end of the core shroud and sloping outwardly downwards from this common center.

* * * * *